United States Patent
Legnain et al.

(10) Patent No.: US 9,538,392 B2
(45) Date of Patent: *Jan. 3, 2017

(54) ANTENNA SYSTEMS WITH COMMON OVERHEAD FOR CDMA BASE STATIONS

(71) Applicant: Apple Inc., Cupertino, CA (US)

(72) Inventors: Abdelgader Legnain, Nepean, CA (US); Peter Deane, Fitzroy Harbor, CA (US); Neil M. McGowan, Stittsville, CA (US)

(73) Assignee: Apple Inc., Cupertino, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/216,624

(22) Filed: Mar. 17, 2014

(65) Prior Publication Data

US 2015/0085950 A1    Mar. 26, 2015

Related U.S. Application Data (63) Continuation of application No. 13/543,904, filed on Jul. 9, 2012, now Pat. No. 8,676,267, which is a continuation of application No. 13/116,867, filed on May 26, 2011, now Pat. No. 8,238,977, which is a continuation of application No. 10/698,395, filed on Nov. 3, 2003, now Pat. No. 7,953,446, which is a continuation-in-part of application No. 09/733,059, filed on Dec. 11, 2000, now Pat. No. 8,504,109.

(Continued)

(51) Int. Cl.
| | |
|---|---|
| *H04W 16/28* | (2009.01) |
| *H01Q 1/24* | (2006.01) |
| *H01Q 3/26* | (2006.01) |
| *H01Q 3/40* | (2006.01) |
| *H04W 16/24* | (2009.01) |

(52) U.S. Cl.
CPC .............. *H04W 16/28* (2013.01); *H01Q 1/246* (2013.01); *H01Q 3/26* (2013.01); *H01Q 3/40* (2013.01); *H04W 16/24* (2013.01)

(58) Field of Classification Search
CPC ............ H01Q 1/246; H01Q 3/26; H01Q 3/40; H04W 16/24; H04W 16/28
USPC ............... 455/562.1, 422.1, 132, 277.1, 227; 370/320, 335, 341, 441, 328
See application file for complete search history.

(56) References Cited

U.S. PATENT DOCUMENTS

| | | |
|---|---|---|
| 4,652,879 A | 3/1987 | Rudish et al. |
| 4,723,266 A | 2/1988 | Perry et al. |

(Continued)

FOREIGN PATENT DOCUMENTS

| | | |
|---|---|---|
| EP | 0798872 A2 | 10/1997 |
| GB | 2300549 A | 11/1996 |

(Continued)

OTHER PUBLICATIONS

Alejandro Martinez-Munoz, "Nortel Networks CDMA Advantages of AABS Smart Antenna Technology" Nortel Networks, CDG Technology Forum, Oct. 1, 2002, 11 pages.

*Primary Examiner* — Raymond Dean
(74) *Attorney, Agent, or Firm* — Downey Brand LLP (57) ABSTRACT

Systems and methods for use in CDMA antenna systems are provided in which signals each having a common overhead component are transmitted on a set of adjacent beams of a sector with a micro-timing offset between signals transmitted on adjacent pairs of beams which is large enough that destructive cancellation substantially does not occur between the pair of beams.

20 Claims, 3 Drawing Sheets

Related U.S. Application Data (60) Provisional application No. 60/423,084, filed on Nov. 1, 2002.

(56) References Cited

U.S. PATENT DOCUMENTS

| | | | |
|---|---|---|---|
| 5,317,623 A | 5/1994 | Sakamoto et al. | |
| 5,493,306 A | 2/1996 | Rudish et al. | |
| 5,515,509 A | 5/1996 | Rom | |
| 5,649,287 A | 7/1997 | Forssen et al. | |
| 5,818,814 A | 10/1998 | Testani et al. | |
| 5,832,389 A | 11/1998 | Dent | |
| 6,072,788 A | 6/2000 | Peterson et al. | |
| 6,141,335 A | 10/2000 | Kuwahara et al. | |
| 6,141,542 A | 10/2000 | Kotzin et al. | |
| 6,157,612 A | 12/2000 | Weerackody et al. | |
| 6,161,010 A | 12/2000 | Oguri et al. | |
| 6,173,005 B1 | 1/2001 | Kotzin et al. | |
| 6,181,276 B1 * | 1/2001 | Schlekewey | H04W 16/28 342/372 |
| 6,185,440 B1 | 2/2001 | Barratt et al. | |
| 6,289,228 B1 | 9/2001 | Rotstein et al. | |
| 6,320,853 B1 | 11/2001 | Wong et al. | |
| 6,324,405 B1 * | 11/2001 | Young | H04B 7/18508 455/12.1 |
| 6,330,460 B1 * | 12/2001 | Wong | H01Q 1/246 455/517 |
| 6,463,303 B1 | 10/2002 | Zhao | |
| 6,606,058 B1 | 8/2003 | Bonek et al. | |
| 6,609,008 B1 | 8/2003 | Whang et al. | |
| 6,640,112 B1 | 10/2003 | Lee et al. | |
| 6,795,424 B1 | 9/2004 | Kapoor et al. | |
| 6,804,307 B1 | 10/2004 | Popovic | |
| 6,909,707 B2 | 6/2005 | Rotstein et al. | |
| 6,922,435 B2 | 7/2005 | Neufeld et al. | |
| 7,130,339 B2 | 10/2006 | Frank | |
| 7,953,446 B2 | 5/2011 | Legnain et al. | |
| 2001/0034236 A1 | 10/2001 | Tong et al. | |
| 2002/0034270 A1 | 3/2002 | Ylitalo | |
| 2002/0072393 A1 | 6/2002 | McGowan et al. | |
| 2003/0022635 A1 | 1/2003 | Benning et al. | |
| 2003/0087640 A1 | 5/2003 | Rotstein et al. | |
| 2004/0102203 A1 | 5/2004 | Tiirola et al. | |

FOREIGN PATENT DOCUMENTS

| | | |
|---|---|---|
| GB | 2335572 A | 9/1999 |
| JP | 05043260 A | 2/1993 |
| JP | 07212828 A | 8/1995 |
| JP | 10322408 A | 12/1998 |
| JP | 11068696 A | 3/1999 |
| JP | 11088941 A | 3/1999 |
| WO | WO9630964 | 10/1996 |
| WO | WO9940648 | 8/1999 |
| WO | WO0139395 A1 | 5/2001 |
| WO | WO0189112 A1 | 11/2001 |
| WO | WO0199240 A2 | 12/2001 |
| WO | WO0199240 A3 | 12/2001 |

* cited by examiner

ANTENNA SYSTEMS WITH COMMON OVERHEAD FOR CDMA BASE STATIONS

RELATED APPLICATIONS

This application is a continuation of U.S. application Ser. No. 13/543,904, filed on Jul. 9, 2012, entitled, "Antenna Systems With Common Overhead For CDMA Base Stations", now U.S. Pat. No. 8,676,267, issued on Mar. 18, 2014, which is a continuation of U.S. application Ser. No. 13/116,867, filed on May 26, 2011, entitled "Antenna Systems with Common Overhead for CDMA Base Stations", now U.S. Pat. No. 8,238,977, issued on Aug. 7, 2012, which is a continuation of U.S. application Ser. No. 10/698,395, filed Nov. 3, 2003, entitled "Antenna Systems with Common Overhead for CDMA Base Stations", now U.S. Pat. No. 7,953,446, issued May 31, 2011, which is a continuation-in-part of U.S. application Ser. No. 09/733,059, filed Dec. 11, 2000, bearing the same title, now U.S. Pat. No. 8,504,109, issued Aug. 6, 2013, and which also claims the benefit of U.S. Provisional Application No. 60/423,084, filed Nov. 1, 2002, all of which are hereby incorporated by reference in their entireties as though fully and completely set forth herein.

FIELD OF THE INVENTION

This invention relates in general to CDMA (Code Division Multiple Access) cellular communication systems and in particular to methods and apparatus for increasing the capacity of such systems.

BACKGROUND OF THE INVENTION

CDMA cellular systems are currently in widespread use throughout North America providing telecommunications to mobile users. In order to meet the demand for transmission capacity within an available frequency band allocation, CDMA cellular systems divide a geographic area to be covered into a plurality of cell areas. Within each cell is positioned a base station with which a plurality of mobile stations within the cell communicate.

In general, it is desired to have as few base stations as possible. This is because base stations are expensive and require extensive effort in obtaining planning permission. In some areas, suitable base station sites may not be available. In order to have as few base stations as possible, each base station ideally has as large a capacity as possible in order to service as large a number of mobile stations as possible. Several key parameters that determine the capacity of a CDMA digital cellular system are: processing gain, ratio of energy per bit to noise power, voice activity factor, frequency reuse efficiency and the number of sectors in the cell-site antenna system.

AABS (Adaptive Antenna Beam Selection) is a method used in CDMA cellular Base Stations to improve traffic capacity in "hot spot" sectors without requiring additional carriers (i.e. more spectrum) at the hot spot. This spectrally efficient technique replaces the standard sector antenna beam pattern with a multiplicity, typically three, of beams per sector. These new beams have higher directivity on both the forward and reverse links. This higher directivity reduces the forward interference seen by a mobile terminal and reduces the received interference level at the base station's receiver. Consequently, the RF power required to support a typical call in the forward ink is lower than that required for a conventional antenna beam. This results in a significantly greater number of AABS calls being supportable with a base station's limited transmitter power than is possible with a conventional sector beam.

In a similar manner to the forward link situation, the reverse link AABS beams are more directive than a conventional sector beam. As a result, the mobile terminal's RF power required to support a typical call in an AABS sector will be lower than for a conventional sector call. This will also help prolong the mobile terminal's battery life.

Figure 1:
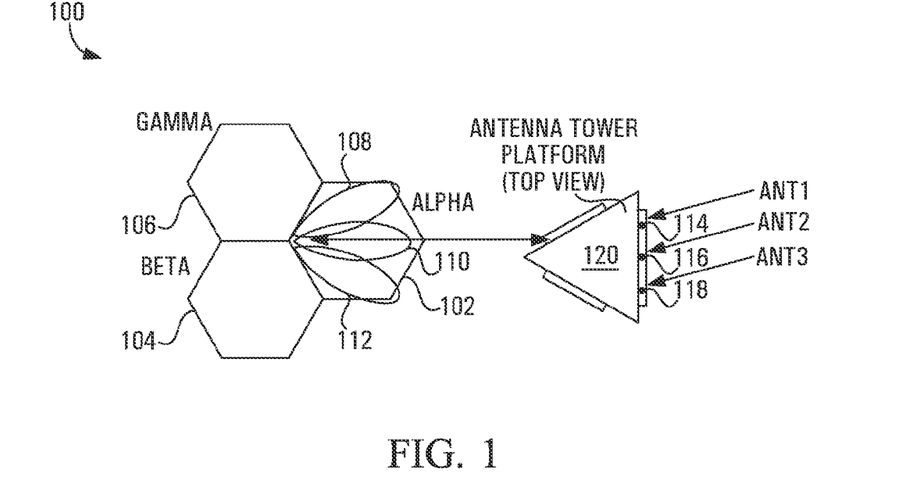
FIG. 1 is a diagram of a conventional tri-cellular CDMA communication cell modified to show three narrow beams in place of the normal single wide beam per sector.

An example of the AABS method of achieving an increase in capacity is shown in FIG. 1 in which a single wide beam width antenna per sector is replaced with an antenna array that allows the formation of a number of narrower beam widths that cover the area of the original beam. Referring to FIG. 1, a conventional CDMA communication cell 100 is shown comprising three adjacent sectors, alpha 102, beta 104 and gamma 106. Each cell comprises an antenna tower platform 120 located at the intersection of the three sectors. The antenna tower platform 120 has three sides forming an equilateral triangle. Each sector has three antennas. Only the antennas in sector alpha 102 are shown, and these consist of a first antenna 114, a second antenna 116 and third antenna 112 mounted on a side of the antenna tower platform 120. Each sector also has three beams. Only the beams in sector alpha 102 are shown, and these consist of a first beam 108, a second beam 110 and a third beam 112. The three beams 108,110,112 are adjacent with some overlap. The three sectors alpha 102, beta 104 and gamma 106 are identical in structure with respect to antennas and beams. The signal for a particular user can then be sent and received only over the beam or beams that are useful for that user. If the pilot channel on each beam is unique (i.e. has a different PN (pseudo-random noise) offset) within each sector then the increase in capacity is limited due to interference between reused pilot channels in different cells.

An improvement is to use multiple narrow beams for the traffic channels and transmit the overhead channels (pilot, sync, and paging channels) over the whole sector so that the pilot channel is common to all the narrow beams used by the traffic channels in that sector. This leads to substantial gains in capacity. For example, a change from a system with a single beam per sector to a system with three beams per sector with a common pilot channel yields a 200 to 300% increase in capacity. It is therefore desirable that the pilot channel be broadcast over the area covered by the original wide beam. A possible arrangement is to use multiple beams per sector for the traffic channels and transmit the overhead channels over a separate wide beam antenna covering the whole sector. However, this requires the expense of extra hardware as well as the calibration and adjustment needed to match the phase of the pilot channel with the phase of the traffic channels over time and temperature.

Another possible solution is to use adaptive antenna array techniques to transmit and receive multiple narrow beams for the traffic channels and to transmit the overhead channels over the whole sector on the same antenna array. However, this requires complex calibration equipment and algorithms.

Yet another solution is to use an antenna array that transmits and receives multiple sectors over fixed narrow beams for the traffic channels and transmits the pilot channel on the same fixed narrow beams. However, the problem with this approach is that the strength of the pilot channel signal at any point in the sector is determined by the vector sum of all of the pilot channel signals from each beam. Since the pilot channel signals from each beam are coherent, areas where the vector sum of the pilot channel signals is null or severely degraded will occur. This can result in dropped calls when a mobile station enters one of these areas.

There is thus an advantage to provide an antenna array that uses fixed narrow beams for transmitting and receiving the traffic channels on multiple beams and can broadcast the common pilot channel over all of the sector using the same antenna array. Furthermore, it would be advantageous to provide an antenna system that did not require complex calibration and adjustment to maintain performance over time and temperature.

In CDMA cellular systems the (typically three) sectors at each site are identified by their PN offsets of the short code. The short code is a full length pseudo random sequence of 2^15−1 bits which repeats exactly 75 times every two seconds. All PN offsets are differentiated from each other by multiples of 64 chips which results in 512 PN offsets in total. In a similar manner to frequency re-use planning in a frequency division network, a CDMA network needs to have a PN plan which avoids PN ambiguities between different sectors and an effect known as PN pollution which can seriously impact a network's traffic capacity and dropped call rate.

Bearing in mind the limited number of PN offsets available to a network, one of the major advantages of AABS is that the increased number of beams utilized by the AABS sectors does not increase the number of PN offsets required by the network. Consequently there is no requirement for expensive and time consuming "optimization" when AABS sectors are introduced into a CDMA network.

SUMMARY OF THE INVENTION

Other aspects and features of the present invention will become apparent to those ordinarily skilled in the art upon review of the following description of the specific embodiments of the invention in conjunction with the accompanying figures.

According to one broad aspect, the invention provides an antenna system for a transmitter comprising: a plurality of antennas defining a respective plurality of fixed beams which together cover a coverage area; for each antenna a respective signal generator generating a respective signal comprising a common overhead component common to all the signals; transceiver circuitry connecting the signal generators to the antennas such that a respective one of the signals is transmitted by each antenna; wherein the each pair of signals transmitted on an adjacent pair of said antennas has a respective mutual micro-timing offset which is large enough that destructive cancellation substantially does not occur between the pair.

In some embodiments, an antenna system, implemented for a plurality of coverage areas, each coverage area being a respective sector served by the base station.

In some embodiments, the transmitter is a CDMA base station, and each signal is a CDMA signal.

In some embodiments, the respective mutual micro-timing offset is small enough that substantially no signal source ambiguity occurs at a receiver.

In some embodiments, the sector has a sector-specific spreading code, and wherein the respective mutual micro-timing offset between each pair of CDMA signals is realized by applying the sector-specific spreading code with a respective mutual micro-offset.

In some embodiments, the sector-specific spreading code is a PN code.

In some embodiments, each mutual micro-offset is at least one chip and less than eight chips.

In some embodiments, each mutual micro-offset is half a width of a traffic search less than a window/space implemented in a mobile terminal community with the base station.

In some embodiments, the sector-specific code is a short code having a sector specific offset used to distinguish between other sources using the same short code, and wherein the respective mutual micro-timing offset is small enough that substantially no ambiguity between different sector specific offsets occurs at a receiver in respect of any pair of signals transmitted by adjacent antennas.

In some embodiments, the short code is of length 2^15−1.

In some embodiments, the sector has a sector-specific spreading code, and wherein the respective mutual micro-timing offset between each pair of CDMA signals is realized by applying the micro-timing offset to respective sector-specific spreading code generators.

In some embodiments, the common overhead component comprises at least one of pilot channel, sync channel, paging channel, quick paging, advanced access channel and auxiliary pilot.

In some embodiments, a system further comprises: for each active user located within the sector, at a given instant only one of the CDMA signals includes a user-specific traffic component generated by the respective CDMA signal generator.

In some embodiments, the one of the CDMA signals to include the user-specific traffic component for a given user is identified by analyzing signal strength on reverse links from the user, and selecting the CDMA signal corresponding with the reverse link having a best signal strength.

In some embodiments, the transceiver circuitry is further adapted to provide transmit frequencies in a manner such that the transmit frequencies include a frequency offset from one another.

In some embodiments, a system comprises a beam-forming matrix.

In some embodiments, the beam-forming matrix is a Butler matrix.

In some embodiments, the frequency offset is chosen to further reduce undesirable effects of signal cancellation.

In some embodiments, the signals have unique traffic channels.

In some embodiments, the frequency offset is a multiple other than that of the frame rate.

In some embodiments, the frequency offset is greater than 30 Hz and less than 120 Hz.

In some embodiments, a system further comprises: means in the transceivers for providing transmit phases that include a time dependent phase offset from one another, wherein the phase offset is chosen to reduce undesirable effects of signal cancellation.

According to another broad aspect, the invention provides a method in a CDMA antenna system comprising transmitting signals each having a common overhead component on a plurality of adjacent beams of a sector with a micro-timing offset between signals transmitted on adjacent pairs of beams which is large enough that destructive cancellation substantially does not occur between the pair of beams.

DETAILED DESCRIPTION OF THE PREFERRED EMBODIMENTS

In order to transmit and receive unique traffic channels on each beam in a sector while transmitting common overhead channels (for example pilot, sync, paging channels, quick paging, advanced access channel and auxiliary pilot) over all of the beams in the sector, an antenna system using fixed narrow beams that does not require complex calibration equipment and algorithms is provided.

Figure 2A:
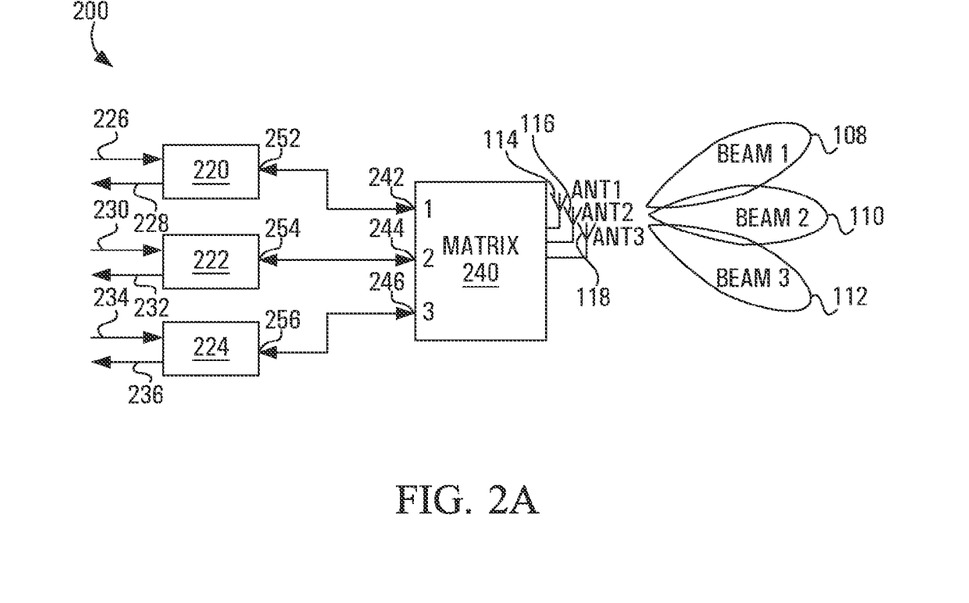
FIG. 2A is a diagram of an antenna system provided by an embodiment of the invention.

To this end, FIG. 2A shows an antenna system 200 that is implemented within one sector of a sectorized base station, for example within sector alpha 102 of FIG. 1. The sectors beta 104 and gamma 106 have identical antenna systems. The antenna system 200 defines a first beam 108, a second beam 110 and a third beam 112. The three beams 108,110, 112 are radiation/reception patterns formed by a first antenna 114, a second antenna 116 and a third antenna 118 respectively. The three antennas 114,116,118 are connected to a beam-forming matrix 240 that may be, for example, a Butler matrix. The beam-forming matrix 240 comprises three bi-directional ports: a first port 242, a second port 244 and a third port 246. The input signals of the first port 242, the second port 244 and the third port 246 are transmitted on the first beam 108, the second beam 110 and the third beam 112 respectively. The signals received on the first beam 108, the second beam 110 and the third beam 112 are the outputs of the first port 242, the second port 244 and the third port 246 respectively. The antenna system 200 also comprises a first transceiver 220, a second transceiver 222 and third transceiver 224. The first transceiver 220 has an input 226, an output 228 and a bi-directional port 252. The second transceiver 222 has an input 230, an output 232 and a bi-directional port 254. The third transceiver 224 has an input 234, an output 236 and a bi-directional port 256. The first port 242, second port 244 and third port 246 of the beam-forming matrix 240 are connected to bi-directional port 252 of the first transceiver 220, bi-directional port 254 of the second transceiver 222 and bi-directional port 256 of the third transceiver 224 respectively.

Also shown for each transceiver 220,222,224 is a respective CDMA signal generator 219,221,223 each of which generates a respective one of the input signals 226,230,234 to the transceivers 220,222,224. The details of the CDMA signal generators 219,221,223 are not shown. This is because there are many different ways to implement circuits/systems which generate CDMA signals which are well understood. The salient feature is that each signal is generated using a respective PN code. The PN code is unique to each sector (at least it is unique within some area). A different PN code would be generated for each sector. Nominally, the same PN code is transmitted on all of the three narrow beams 108,110,112. However, in this embodiment of the invention, a small time offset is applied to the PN code used in two of the three CDMA signal generators, the effect of this being that the first signal 226 is generated with a PN code PN(t), the second signal 230 is generated using the PN code PN(t+$\Delta t_1$) and the third signal 234 is generated with a PN code PN (t+$\Delta t_2$). In other words, the PN code used to generate the second signal 230 is offset from that used to generate the first signal 226 by a time offset $\Delta t_1$. Similarly, the PN code used to generate the third signal 234 is offset from that used to generate the second signal 230 by a time offset of $\Delta t_3 = \Delta t_2 \times \Delta t_1$. Each PN-code generator may for example be implemented with a series of flip-flops with specific interconnects. Different time offset can be achieved by starting the flip-flops at a predefined state at t=0. Different time-shifts require different starting defined states. There are many other ways of PN code generation which would be understood by one skilled in the art The offsets $\Delta t_3$, $\Delta t_1$ are selected to reduce substantially interference overhead portions transmitted on overlapping beams in a single sector.

The example of FIG. 2A includes three beams per sector. The invention is in no way limited to this. More generally, it is applicable for any number of beams greater than two. The mutual micro-timing offset is then introduced between each pair of adjacent beams. What is important is that adjacent beams have a timing offset which reduces the interference in the overlap portions. The overall set of offsets should fall within the search window of the receiver. This may necessitate some positive offsets and some negative offsets if the number of beams is large. For example, even numbered beams could use p(t) and odd numbered beams could use p(t+$\Delta t$).

The Algorithm

Each beam is offset from its neighbouring beam by a "micro" PN offset. Micro in this context means at least a minimum resolvable PN chip offset (for example 814 nS for IS-95 and 1XRTT), but less than a maximum which might introduce base station identification ambiguities in a network.

The minimum micro PN offset is a system specific parameter. Preferably it is just large enough so that substantially no destructive interference occurs in the area of beam overlap. The minimum may also be further defined by the minimum offset differential which can be individually discriminated at the receiver. In one example, this minimum is set to one chip. The main reason for applying this micro-PN offset is to avoid destructive interference in the beam overlap region.

The second requirement for an offset that is low enough to avoid PN ambiguities from other base stations is necessary to minimize pilot pollution effects such as dropped calls and excess required forward power. In systems which do not employ PN offsets for signal source identification, this maximum "micro" offset constraint may not be necessary. The exact value of this maximum PN offset would likely be network specific and proportional to the PN increment used in the network, the "PN increment" being a multiple of the system PN offset (64 chips for many systems). For example, for networks with PN increments of 4, an 8 chip differential offset would be a practical maximum whereas in dense urban environments with a PN increment of 2, a 4 chip maximum differential offset would be more appropriate.

A third implementation specific consideration in selecting the micro PN offset is the search window signal used by mobile terminals. In order that the mobile terminal will find the different signals with its searcher, it is preferred that the set of mutual micro-timing offsets is less than half a width of a traffic search window implemented in a mobile terminal communicating with the base station.

An advantage of this scheme from a forward link power point of view, is that the destructive cancellation between forward link signals is avoided without adding artificial fading (described below), thus leading to an improved reliability and tolerance to beam selection errors in the beam overlap regions.

Figure 2B:
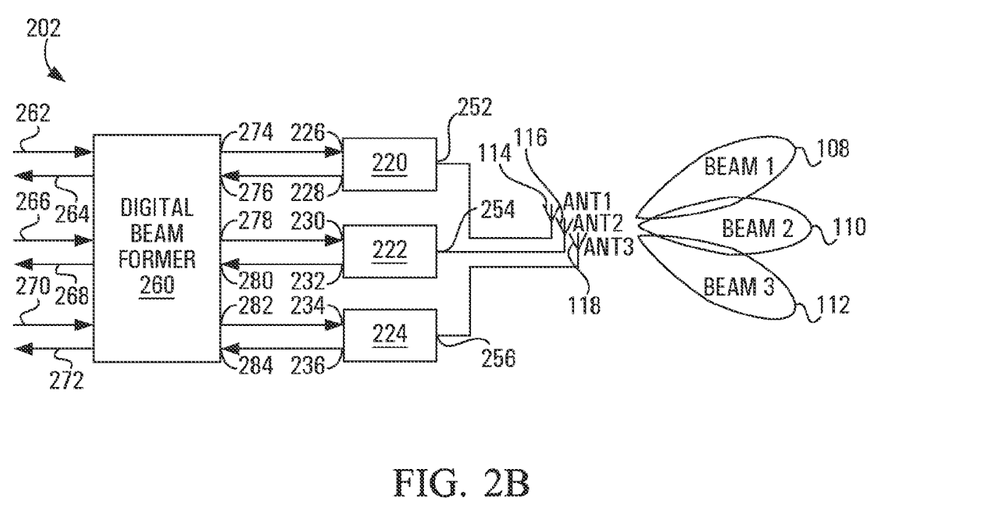
FIG. 2B is a diagram of another antenna system provided by an embodiment of the invention.

FIG. 2B shows another antenna system 202 that may be deployed for example within sector alpha 112, as provided by an embodiment of the invention. The antenna system 202 defines a first beam 108, a second beam 110 and a third beam 112. The three beams 108, 110, 112 are radiation/reception patterns formed by a first antenna 114, a second antenna 116 and a third antenna 118 respectively. The antenna system 202 also comprises a first transceiver 220, a second transceiver 222 and third transceiver 224. The first transceiver 220 has an input 226, an output 228 and a bi-directional port 252. The second transceiver 222 has an input 230, an output 232 and a bi-directional port 254. The third transceiver 224 has an input 234, an output 236 and a bi-directional port 256. The three antennas 114, 116, 118 are connected to the three respective bi-directional ports 252, 254, 256 of the transceivers 220, 222, 224. The antenna system 202 also comprises a digital beam former 260 that has a first input 262, a first output 264, a second input 266, a second output 268, a third input 270, a third output 272, a first beam output 274, first beam input 276, a second beam output 278, a second beam input 280, a third beam output 282 and a third beam input 284. The first beam output 274 and input 276 of the digital beam former 260 are connected the input 226 and output 228 of the first transceiver 220 respectively. The second beam output 278 and input 280 of the digital beam former 260 are connected the input 230 and output 232 of the second transceiver 222 respectively. The third beam output 282 and input 284 of the digital beam former 260 are connected the input 234 and output 236 of the third transceiver 220 respectively.

Although three antennas forming three beams per sector are used in this example of the preferred embodiment, any number of antennas and beams per sector greater than one may be used while remaining within the scope of the invention.

Referring to FIG. 2B, the signals on input 226, input 230 and input 234 of transceiver 220, transceiver 222 and transceiver 224 respectively are digital baseband signals that are transmitted on the first beam 108, the second beam 110 and the third beam 112 respectively. The signals on output 228, output 232 and output 236 of transceiver 220, transceiver 222 and transceiver 224 respectively are digital baseband signals that are received on the first beam 108, the second beam 110 and the third beam 112 respectively.

The digital baseband signals on input 226, input 230 and input 234 of transceiver 220, transceiver 222 and transceiver 224 respectively may be any CDMA standard digital data stream adapted to be received by a plurality of mobile stations (not shown) within the area covered by the first beam 108, the second beam 110 or the third beam 112.

Similarly, referring to FIG. 2B, the signals on input 262, input 266 and input 270 of the digital beam former 260 are digital baseband signals that are transmitted on the first beam 108, the second beam 110 and the third beam 112 respectively. The signals on output 264, output 268 and output 272 of the digital beam former 260 are digital baseband signals that are received on the first beam 108, the second beam 110 and the third beam 112 respectively.

Also shown are CDMA signal generators 219, 221, 223 which function in the same manner as the like-numbered elements of FIG. 2A.

The digital baseband signals on input 262, input 266 and input 270 of the digital beam former 260 may be any CDMA standard digital data stream adapted to be received by a plurality of mobile stations (not shown) within the area covered by the first beam 108, the second beam 110 or the third beam 112.

The transceivers 220, 222, 224 of FIG. 2A or FIG. 2B may be conventional transceivers, or may be designed so as to further reduce the probability of destructive interference occurring in the area of overlap adjacent narrow beams.

FIGS. 2A and 2B provide two examples of transceiver circuitries between the CDMA signal generators and the antennas. Other transceiver circuitries can be employed to get the CDMA signals transmitted on the beams.

Figure 3:
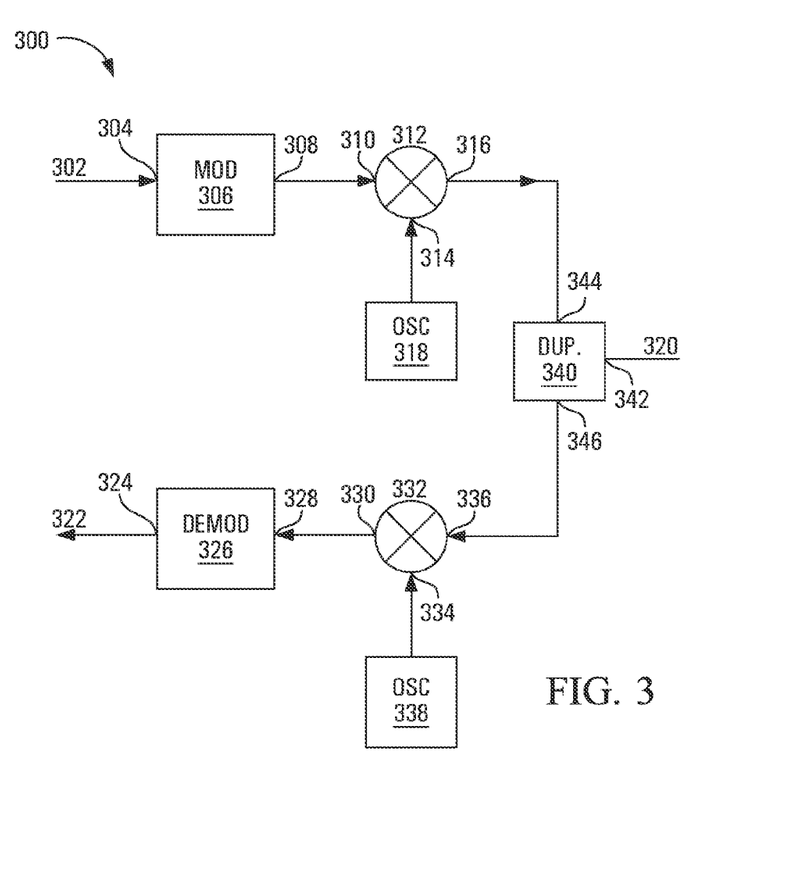
FIG. 3 is a diagram showing a transceiver provided by an embodiment of the invention which may be used in the antenna systems of FIGS. 2A and 2B.

Another implementation of the transceivers of FIGS. 2A and 2B will now be described with reference to FIG. 3. This embodiment features additional measures beyond the above-described "micro" PN offset which may be included in some embodiments. Conventional transceivers could be employed, and would still benefit from the "micro" PN offset scheme. For ease of description the transceiver shown in FIG. 3 is given the reference number 300. Transceiver 300 has its input 302 connected to an input of a modulator 306. The modulator 306 has an output 308 that is connected to a first input 310 of an up-converter 312. The up-converter 312 also has a second input 314 and an output 316. The second input 314 of the up-converter 312 is connected to an oscillator 318 that may be, for example, a digital frequency synthesizer. The output 316 of the up-converter 312 is connected to an input 344 of a duplexor 340 having a bi-directional port 342 connected to the bi-directional port 320 of the transceiver 300. The transceiver 300 also has an output 322 connected to an output 324 of a demodulator 326. The demodulator also has an input 328 that is connected to an output 330 of a down-converter 332. The down-converter 332 also has a first input 334 and a second input 336. The first input 334 of the down-converter 332 is connected to an oscillator 338 and the second input 336 of the down-converter 332 is connected to an output 346 of the duplexor 340. The up-conversion stage of the transceiver 300, comprising the up-converter 312 and oscillator 318, are shown as a single stage for convenience. In reality the up-conversion may be done in a plurality of stages. Similarly, the down-conversion stage of the transceiver 300, comprising the down-converter 332 and oscillator 338, are shown as a single stage for convenience. In reality the down-conversion may be done in a plurality of stages.

The frequency of the oscillator 318 in transceiver 222 is chosen such that the frequency of the output 316 of the up-converter 312 in the transceiver 222 is a standard base station transmit frequency, $f_c$. The frequency of the oscillator 318 in the transceiver 220 is chosen such that the frequency of the output 316 of the up-converter 312 in the transceiver 220 is $f_c$ plus an offset frequency, $f_o$. The frequency of the oscillator 318 in the transceiver 224 is chosen such that the frequency of the output 316 of the up-converter 312 in the transceiver 224 is $f_c$ minus the offset frequency, $f_o$. For example, if $f_c$=1940 MHz and $f_o$=40 Hz, then the frequency output of the up-converter 312 in the transceiver 222 equal to 1940 MHz, the frequency output of the up-converter 312 in the transceiver 220 is equal to 1940.00004 MHz and the frequency output of the up-converter 312 in the transceiver 224 is 1939.99996 MHz. The purpose of including these offsets in the oscillator frequencies used in the transceivers is to reduce the likelihood that in the area of overlap between adjacent beams there will be destructive interference. In the example given above, adjacent pairs of frequencies used for the three beams are spaced by an identical 40 Hz. However, it is to be understood that it is not essential to use identical spacing between adjacent pairs.

Figure 4A:
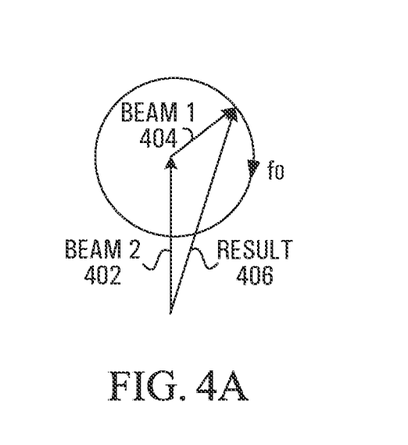
FIGS. 4A and 4B are diagrams showing the vector addition of signals from a first beam and a second beam.
Figure 4B:
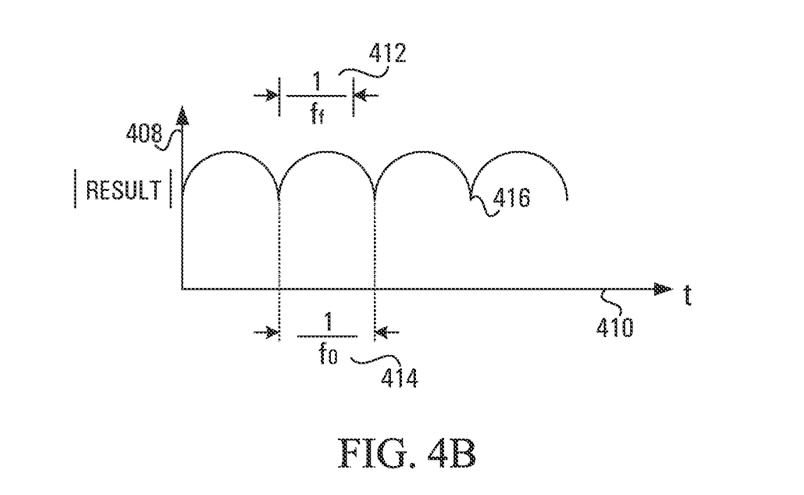

The signal strength of the pilot channel at any point in the sector is determined by the vector sum of all of the pilot channel signals from each beam. For example, referring to FIG. 4A, the signal at a point from the second beam 110 is represented by vector 402. The signal at the same point from the first beam 108 is represent by vector 404. Since the frequency of the signal transmitted on the first beam 108 is offset by $f_o$ from the frequency of the second beam 110, the vector 404 rotates with respect to vector 402 and hence, the magnitude of resultant vector 406 will fluctuate with a $1/f_o$ time period. FIG. 4B shows a plot of the magnitude 408 of the result vector 406 versus time 410. Due to the rotation of vector 404 a minimum 416 value occurs every $1/f_o$ 414. In an IS-95 forward channel, the frame rate $f_f$ is 50 frames per second or a period of 20 ms. Also, each IS-95 frame is repeated once. Therefore the offset frequency $f_o$ is chosen such that $1/f_o$ 414 is not a multiple of $1/f_f$ 412. This will prevent a minimum 416 from occurring at the same point in two consecutive frames thus significantly reducing the error rate.

Since the magnitude of the resultant vector 406 fluctuates with a $1/f_o$ time period, $f_o$ is chosen by empirical methods such that the overall system performance is optimized. The optimum value of $f_o$, for each base station, is influenced by environmental factors, the maximum velocity of the mobile stations, the frequency band and the over-the-air interface. Typically $f_o$ is greater than 30 Hz and less than 120 Hz for an IS-95 CDMA communication system. Other over-the-air interface standards may have optimum performance at different values of $f_o$.

The frequencies of oscillator 338 in transceiver 220, oscillator 338 in transceiver 222 and oscillator 338 in transceiver 224 are identical and chosen such that IS-95 signals at standard frequencies are down-converted and demodulated.

The traffic channels on each beam are unique and uncorrelated so that no cancellation of the traffic channels occurs.

In an alternative embodiment, the waveform of the oscillator 318 in transceiver 222 is chosen such that the waveform of the output 316 of the up-converter 312 in the transceiver 222 is a standard IS-95 base station transmit frequency, $f_c$. The waveform of the oscillator 318 in the transceiver 220 is chosen such that the waveform of the output 316 of the up-converter 312 in the transceiver 220 is $f_c$ with a time dependent phase offset within a range of −180° to 180°. The waveform of the oscillator 318 in the transceiver 224 is chosen such that the waveform of the output 316 of the up-converter 312 in the transceiver 224 is $f_c$ with time dependent phase offset within a range of −180° to 180°. The waveform of the output 316 of the up-converter 312 in the transceiver 222 is the reference for 0° phase. The time dependent phase offset within may be sinusoidal, random or any other pattern that results in the phases of the output of oscillator 318 in the transceiver 220, the output of oscillator 318 in the transceiver 222 and the output of oscillator 318 in the transceiver 224 being incoherent. Hence, the phases of the first beam 108, the second beam 110 and the third beam 112 are incoherent.

In the preferred embodiment the signals on input 226, input 230 and input 234 of transceiver 220, transceiver 222 and transceiver 224 respectively have identical IS-95 overhead channels (pilot, synchronization and paging channels) and unique IS-95 traffic channels corresponding to mobile station(s) (not shown) that are transmitting/receiving on the first beam 108, the second beam 110 and the third beam 112 respectively. Mobile stations that move from beam to beam or are in an area of overlapping beams are handled by IS-95 handoff procedures.

In an alternative embodiment the signals on input 226, input 230 and input 234 of transceiver 220, transceiver 222 and transceiver 224 respectively have identical IS-2000 overhead channels and unique IS-2000 traffic channels corresponding to mobile station(s) (not shown) that are transmitting/receiving on the first beam 108, the second beam 110 and the third beam 112 respectively. Mobile stations that move from beam to beam or are in an area of overlapping beams are handled by IS-2000 handoff procedures.

It should be noted that while an embodiment of the invention using a Butler matrix 240, as shown in FIG. 2A, does not require a calibration scheme to compensate for differential phases between the transceivers, an embodiment using a digital beam former 260, as shown in FIG. 2B, does require a calibration scheme to compensate for differential phases between the transceivers.

Advantageously, the invention may be used with antenna systems employing diversity schemes, such as space diversity or polarization diversity. In all diversity schemes all overlapping beams should have offset frequencies or time dependent phase offsets.

The above embodiments have focussed on IS-95 CDMA implementations. More generally, these techniques are applicable wherever a sector-specific spreading code is applied within a sector within which multiple beams are being transmitted. PN codes with micro-PN offsets are the sector specific codes employed in the described embodiments. More generally, sector-specific codes with micro-offsets may be employed. A micro-offset is to be distinguished from a regular offset which might be used to indicate two different codes (the same code separated in time by the regular offset—64 chips for the examples described). The invention may also be applicable to non-CDMA systems.

The above described embodiments have solved the overlap problem by introducing a micro-offset in the PN code generation step thereby producing signals which except for exceptional circumstances will not interfere destructively within the overlap region of adjacent beams. In these embodiments, the timing of the PN Code generation is also tied to the timing of the signal. This means that if a micro PN offset is applied, the signal is delayed by the same amount. More generally, the signals to be transmitted on adjacent beams can be differentially delayed as a whole any time after PN code application to substantially the same effect.

While the preferred embodiment of the present invention has been described and illustrated, it will be apparent to persons skilled in the art that numerous modifications and variations are possible. The scope of the invention, therefore, is only to be limited by the claims appended hereto.

The invention claimed is:

1. An antenna system for a transmitter comprising:
a plurality of antennas, each antenna configured to transmit a corresponding beam within a coverage area;
transmit circuitry configured to generate a corresponding transmit signal for each antenna to transmit the corresponding beam;
wherein each pair of transmit signals used to generate beams from corresponding antennas that overlap in coverage area are adjusted so that destructive interference in beam overlap regions substantially does not occur by applying micro-timing offsets to a sector-specific spreading sequence used to generate the transmit signals.

2. The antenna system as recited in claim 1, wherein each transmit signal comprises a common overhead component common to all of the transmit signals.

3. The antenna system as recited in claim 2, wherein each transmit signal comprises a unique traffic component.

4. The antenna system as recited in claim 1, wherein the sector-specific spreading sequence comprises a pseudo-noise (PN) sequence.

5. The antenna system as recited in claim 4, wherein the micro-timing offsets equal at least one chip of the corresponding PN sequence.

6. The antenna system as recited in claim 1, wherein the micro-timing offsets exceed a minimum offset that can be individually discriminated at a receiver of a mobile terminal configured to receive the transmit signal.

7. The antenna system as recited in claim 1, wherein the micro-timing offsets span no more than half the width of a traffic search window used by a mobile terminal configured to receive the transmit signal.

8. The antenna system as recited in claim 1, wherein the transmit circuitry comprises beam forming circuitry coupled to the plurality of antennas and a plurality of transceivers coupled to the beam forming circuitry.

9. The antenna system as recited in claim 8, wherein the beam forming circuitry comprises a Butler matrix coupled between the plurality of transceivers and the plurality of antennas.

10. The antenna system as recited in claim 1, wherein the transmit circuitry comprises a plurality of transceivers that include oscillators that generate up-converted output signals at different frequencies for adjacent antennas that generate radio frequency beams that overlap in the coverage area.

11. The antenna system as recited in claim 10, wherein the different frequencies used in the oscillators of the transceivers reduce the likelihood of destructive interference in the beam overlap regions.

12. The antenna system as recited in claim 1, wherein the transmitter is a code division multiple access (CDMA) base station, and each transmit signal comprises a CDMA signal.

13. The antenna system as recited in claim 2, wherein the common overhead component comprises at least one of: a pilot channel, a synchronization channel, a paging channel, a quick paging channel, an advanced access channel, or an auxiliary pilot channel.

14. A method for generating a plurality of radio frequency beams that cover a coverage area of a cell of a wireless network, the method comprising:

generating a plurality of transmit signals; and transmitting the plurality of transmit signals through a plurality of antennas, each antenna configured to transmit a corresponding radio frequency beam of the plurality of radio frequency beams within the coverage area of the cell of the wireless network, wherein for each pair of radio frequency beams that overlap in the coverage area, the corresponding transmit signals of the plurality of transmit signals used to generate the radio frequency beams are adjusted so that destructive interference in radio frequency beam overlap regions substantially does not occur by applying micro-timing offsets to a sector-specific spreading sequence used to generate the transmit signals.

15. The method as recited in claim 14, wherein each transmit signal comprises a common overhead component common to all of the transmit signals and a unique traffic component.

16. The antenna system as recited in claim 15, the unique traffic component of each transmit signal is uncorrelated with each other such that no cancellation of the traffic component in the radio frequency beam overlap regions occurs.

17. The method as recited in claim 14, wherein the corresponding transmit signals of the plurality of transmit signals used to generate the radio frequency beams are adjusted by transmit circuitry comprising a plurality of transceivers that include oscillators that generate up-converted output signals at different frequencies for adjacent antennas that generate radio frequency beams that overlap in the coverage area.

18. The method as recited in claim 17, wherein the different frequencies used in the oscillators of the transceivers reduce the likelihood of destructive interference in the beam overlap regions.

19. The method as recited in claim 14, wherein the sector-specific spreading sequence comprises a pseudo-noise (PN) sequence.

20. The method as recited in claim 19, wherein the micro-timing offsets equal at least one chip of the corresponding PN sequence.

* * * * *